(12) United States Patent
Hoving

(10) Patent No.: US 8,352,506 B2
(45) Date of Patent: Jan. 8, 2013

(54) AUTOMATIC SUBMISSION OF AUDIOVISUAL CONTENT TO DESIRED DESTINATIONS

(75) Inventor: Allan Hoving, Westport, CT (US)

(73) Assignee: Pod Poster LLC, Westport, CT (US)

( * ) Notice: Subject to any disclaimer, the term of this patent is extended or adjusted under 35 U.S.C. 154(b) by 109 days.

(21) Appl. No.: 12/862,691

(22) Filed: Aug. 24, 2010

(65) Prior Publication Data

US 2011/0055282 A1    Mar. 3, 2011

Related U.S. Application Data

(60) Provisional application No. 61/238,616, filed on Aug. 31, 2009.

(51) Int. Cl.
*G06F 7/00*  (2006.01)
*G06F 17/30* (2006.01)

(52) U.S. Cl. ........................................ 707/802; 725/135

(58) Field of Classification Search .................. 707/792, 707/796, 802, 812; 725/74, 86, 105, 135, 725/143; 348/460, 474, 515, 739
See application file for complete search history.

(56) References Cited

U.S. PATENT DOCUMENTS 7,966,638 B2 * 6/2011 Gossweiler et al. .......... 725/133
2003/0028887 A1 * 2/2003 Frouin et al. ..................... 725/78
2007/0171303 A1 * 7/2007 Barbieri et al. ............... 348/468
2010/0325666 A1 * 12/2010 Wiser et al. ...................... 725/44

OTHER PUBLICATIONS

Philippeau et al., Dynamic organization of audiovisual database using a user-defined similarity measure based on low-level features, 2008, IEEE, 33-36.*

* cited by examiner

*Primary Examiner* — Jean B Fleurantin
(74) *Attorney, Agent, or Firm* — Brill Law Office; Jeffrey Brill

(57) ABSTRACT

An audiovisual content posting system enables a user to post audiovisual comments in response to instances of audiovisual content such as podcasts. The user identifies a specific instance of audiovisual content on which s/he wishes to comment. The audiovisual content posting system prompts the user to record an audiovisual comment, and automatically transmits the recorded audiovisual comment to a destination associated with the content that is the subject of the comment. The audiovisual content posting system can automatically maintain a database storing identifiers of multiple instances of audiovisual content as well as electronic addresses to which to transmit comments thereon. The audiovisual content posting system can then detect changes to these electronic addresses, and automatically update the database accordingly. When the audiovisual content posting system transmits a comment, it can retrieve the appropriate, current electronic address to use from the database.

21 Claims, 4 Drawing Sheets

AUTOMATIC SUBMISSION OF AUDIOVISUAL CONTENT TO DESIRED DESTINATIONS

PRIORITY CLAIM

This patent application claims the benefit of provisional application Ser. No. 61/238,616, titled "Automatic Submission of Audiovisual Content to Desired Destinations," filed on Aug. 31, 2009, the entirety of which is hereby incorporated by reference.

TECHNICAL FIELD

This disclosure pertains generally to posting audiovisual content, and more specifically to enabling users to post comments about podcasts and other audiovisual content in the same form as the audiovisual content itself.

BACKGROUND OF THE INVENTION

Podcasting and other forms of streaming digital audiovisual content are very popular today. A podcast is a series of digital audio and/or video files that is released episodically and downloaded through the Internet. Special client software applications sometimes called podcatchers (for example iTunes®, Zune®, Juice® and Winamp®) automatically access a centrally-maintained web feed in order to identify and download new files in a given series as they are released. As new files appear, they are automatically downloaded and stored locally on the user's computing device. The user can then listen to/view the downloaded content. Podcasts (and other recorded programs, both audio-only and video-with-sound) can be played on many types of computing devices, including desktop and laptop computers, iPhones®, iPads®, iPods®, and other portable computing devices such as Treos® or smartphones running Android®.

Once a podcast (or other type of audiovisual program) ends, the user may want to make a comment on the program s/he has just experienced. If the podcaster maintains a website that supports making comments, the user can navigate to the website and type a written comment into a bulletin board, blog, or other text-based commenting system. However, not all podcasters support adding text based comments, and in any case the user may wish to make a comment in the same medium as the podcast itself. Some podcasters also include a telephone number on their website, which a listener can use to call and record a voice message. However, conventional podcasting systems do not enable users to automatically upload audiovisual comments. Additionally, a user may wish to send her/his comment to destinations other than the podcaster, such as to a friend or colleague. This is not supported by conventional podcasting systems either. It would be desirable to address these issues.

SUMMARY OF THE INVENTION

An audiovisual content posting system enables a user to post audiovisual comments in response to instances of audiovisual content such as podcasts. The user identifies a specific instance of audiovisual content (e.g., a specific podcast) on which s/he wishes to comment (e.g., from a list displayed by the audiovisual content posting system). The audiovisual content posting system prompts the user to record an audiovisual comment, using the recording mechanisms of the user's computing device. The audiovisual content posting system automatically transmits the recorded audiovisual comment to the originator of the content that is the subject of the comment (e.g., a specific podcaster). In some embodiments, the audiovisual content posting system transmits the audiovisual comment to a destination other than the content originator. In some embodiments, the audiovisual content posting system automatically maintains a database storing identifiers of multiple instances of audiovisual content (e.g., different podcasts) as well as electronic addresses (e.g., email addresses) to which to transmit comments (e.g., addresses of podcasters). The audiovisual content posting system can then detect changes to these electronic addresses, and automatically update the database accordingly. When the audiovisual content posting system transmits a comment, it can retrieve the appropriate, current electronic address from the database without the user needing to keep track of where the comment is to be sent.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the subject matter, resort to the claims being necessary to determine such subject matter.

The Figures depict various embodiments for purposes of illustration only. One skilled in the art will readily recognize from the following discussion that other embodiments of the structures and methods illustrated herein may be employed without departing from the described principles.

DETAILED DESCRIPTION

Figure 1:
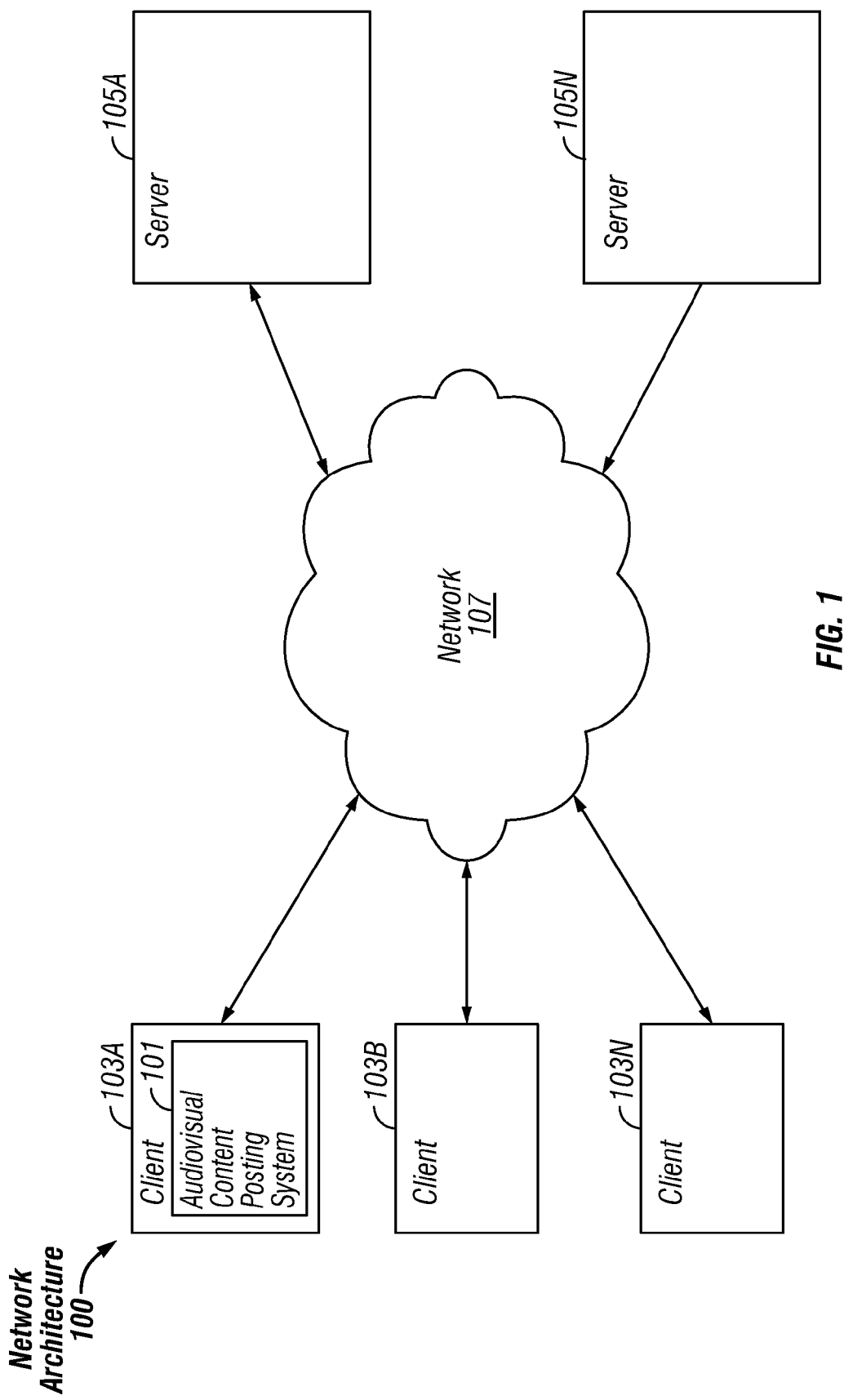
FIG. 1 is a block diagram of an exemplary network architecture in which an audiovisual content posting system can be implemented, according to some embodiments.

FIG. 1 is a block diagram illustrating an exemplary network architecture 100 in which an audiovisual content posting system 101 can be implemented. The illustrated network architecture 100 comprises multiple clients 103A, 103B and 103N, as well as multiple servers 105A and 105N. In FIG. 1, the audiovisual content posting system 101 is illustrated as residing on client 103A. It is to be understood that this is an example only, and in various embodiments this system 101 can be instantiated on a server 105, a client 103 or distributed between multiple servers 105 and/or clients 103.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
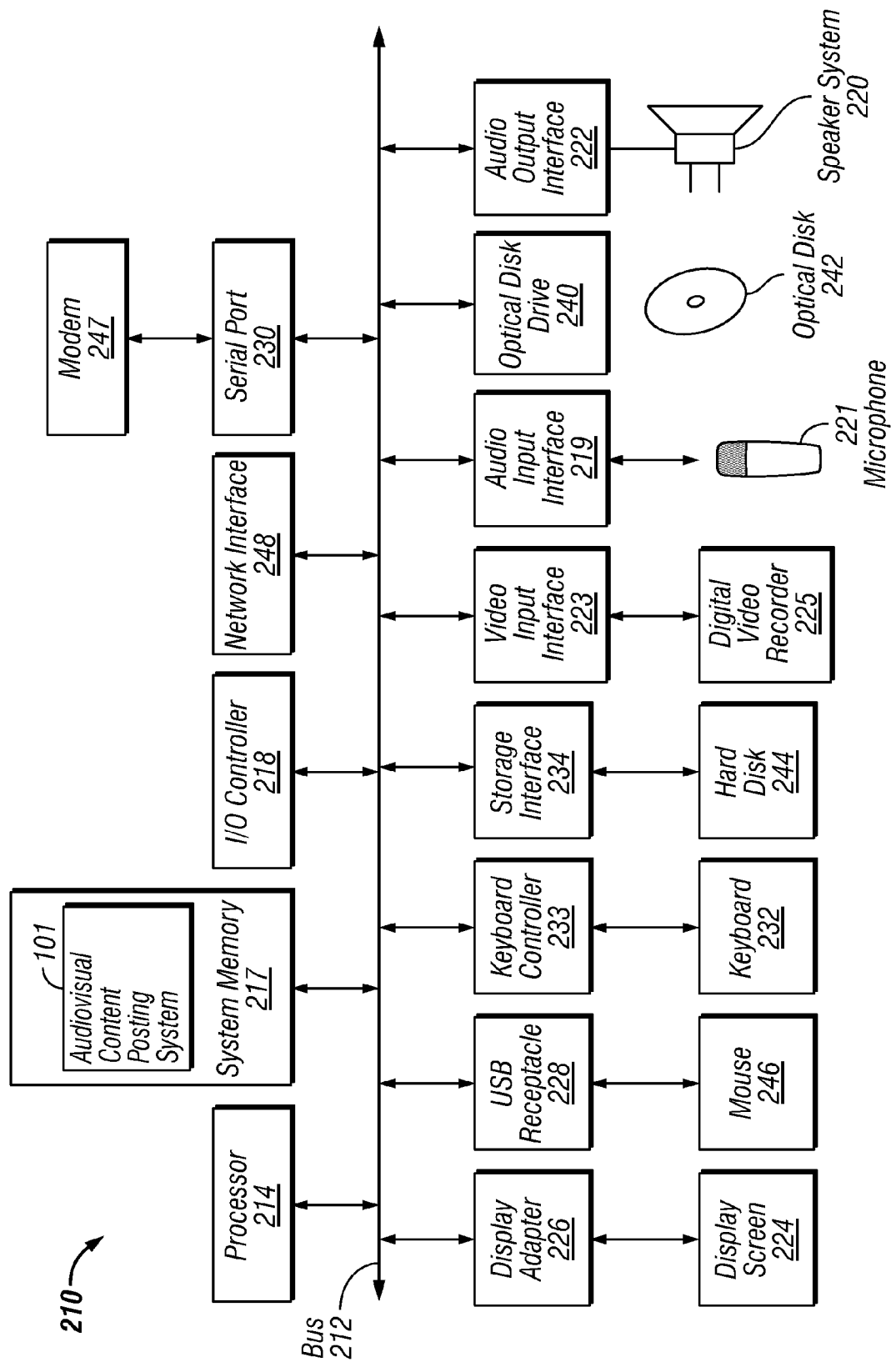
FIG. 2 is a block diagram of a computer system suitable for implementing an audiovisual content posting system, according to some embodiments.

FIG. 2 is a block diagram of a computer system 210 suitable for implementing an audiovisual content posting system 101. Both clients 103 and servers 105 can be implemented in the form of such computer systems 210. Particularly in the case of clients 103, the computer system 210 can be in the form of a portable computing device. As described in greater detail below in conjunction with FIG. 3, a portable computing device is a type of computer system 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio input interface 219 communicatively coupled to an audio input device such as a microphone 221, an audio output interface 222 communicatively coupled to an audio output device such as a speaker system 220, a video input interface 223 communicatively coupled to a video input device such as a digital video recorder 225, a display adapter 226 communicatively coupled to a video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the audiovisual content posting system 101 is illustrated as residing in system memory 217. The workings of the audiovisual content posting system 101 are explained in greater detail below in conjunction with other figures.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
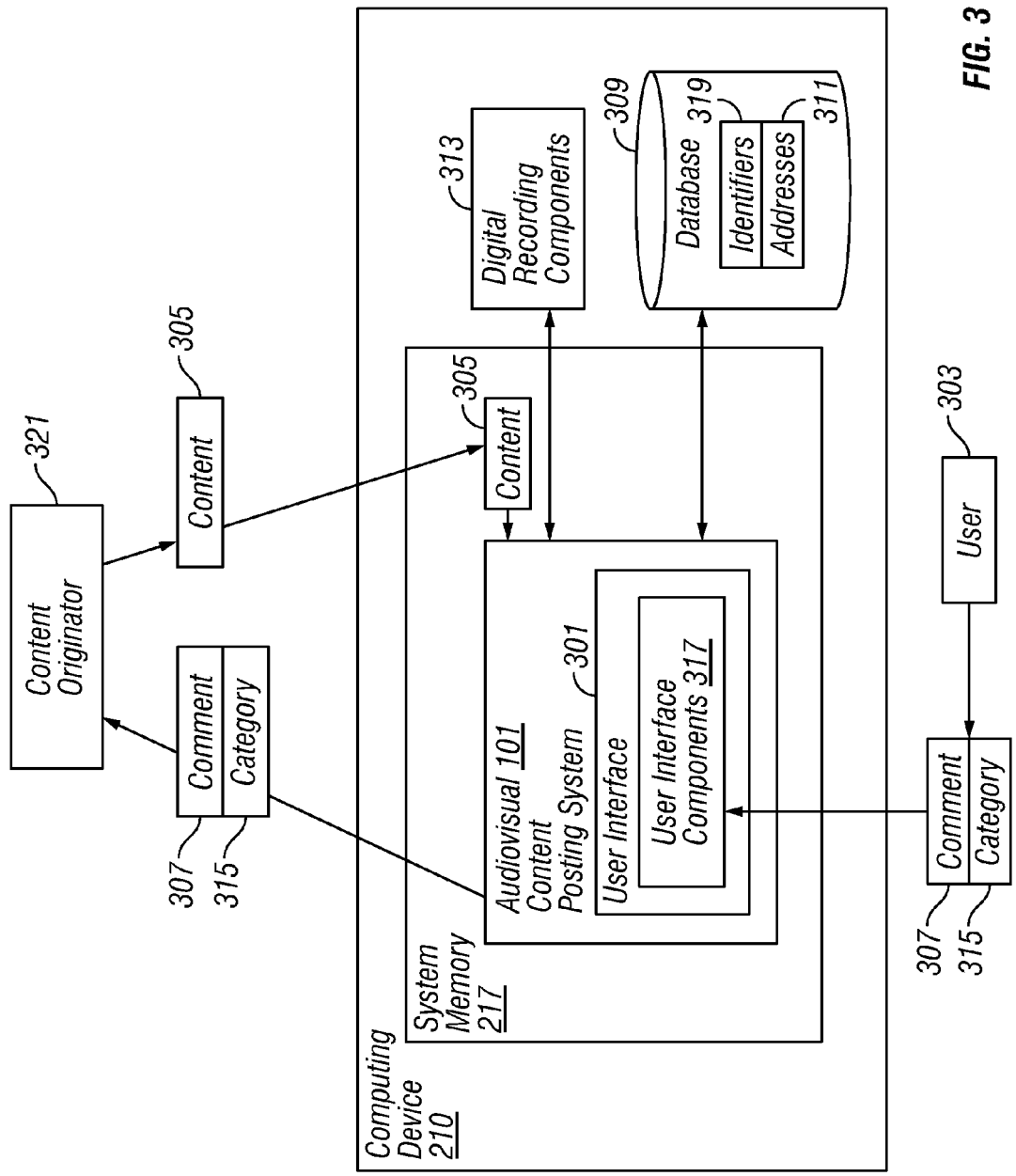
FIG. 3 is a block diagram of the operation of an audiovisual content posting system, according to some embodiments.

FIG. 3 illustrates an audiovisual content posting system 101, residing in the system memory 217 of a computer system 210 according to some embodiments. It is to be understood that although the audiovisual content posting system 101 is illustrated in FIG. 3 as a single entity, the illustrated audiovisual content posting system 101 represents a collection of functionalities, which can be instantiated as a single component or multiple components as desired. It is to be understood that the audiovisual content posting system 101 and components thereof can be instantiated (for example as object code or executable images) within the system memory 217 (e.g., RAM, ROM, flash memory) of a computer system 210, such that when the processor 214 of the computer system 210 processes a component, the computer system 210 executes the associated functionality. As used herein, the terms "computer system," "computer," "client," "client computer," "server," "server computer" and "computing device" mean one or more computers configured and/or programmed to execute the described functionality. In some embodiments, the audiovisual content posting system 101 is instantiated in whole or in part on a portable computing device. As used herein the term "portable computing device" means a computer system 210 that can be practicably moved between and used in different physical locations. Examples of portable computing devices include but are not limited to smartphones, personal digital assistants, laptop computers, etc.

Additionally, program code to implement the functionalities of the audiovisual content posting system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

In some embodiments the audiovisual content posting system 101 is instantiated in the form of an iPhone® app or other type of application running on a user's computing device 210. In this context, the user interface 301 of the audiovisual content posting system 101 can prompt the user 303 to select audiovisual content 305 (e.g., a specific podcast) about which to post an audiovisual comment 307. For example, the user interface 301 can display a list of podcasts, and prompt the user 303 to select one about which to post a comment 307. The user 303 can be prompted to make such a selection via, e.g., a user interface component 317 such as a select button.

In one embodiment, identifiers 319 of podcasts or other instances of audiovisual content 305 about which the user 303 can post comments is stored in a database 309 (or other suitable storage mechanism). FIG. 3 illustrates the database 309 as residing on the user's computing device 210, but in other embodiments the database 309 can reside on a remote server 105 (not illustrated) or can be distributed between multiple computing devices 210 as desired. The database 309 typically stores not only identifiers 319 of audiovisual content 305 (e.g., the names of various podcasts), but also additional associated information, such as a current electronic address 311 to which to transmit (post) a comment 307 about the instance of audiovisual content 305, the format in which to post the comment 307, an image to display by the user interface 301 to identify the instance of audiovisual content 305, or other information concerning the instance of audiovisual content 305 (e.g., any type of metadata about a podcast). In some embodiments, the database 309 is automatically updated by the audiovisual content posting system 101 to reflect any changes to an address 311 to which to post a comment 307 or other information concerning an instance of audiovisual content 305. In some embodiments, the database 309 can be manually updated by the user 303.

The audiovisual content posting system 101 allows the user 303 to record an audiovisual comment 307 to post in response to a selected instance of audiovisual content 305, using the digital recording components 313 available on the computing device 210 (e.g., microphone 221, digital sound recorder, digital video recorder 225, webcam, etc.). Typically, the user interface 301 of the audiovisual content posting system 101 contains buttons or other user interface components 317 directing the user 303 to record a comment 307. When activated by the user 303, these user interface components 317 control the digital recording components 313, and allow the user 303 to record and playback audiovisual comments 307. Typically the user interface components 317 also allow the user to pause, rewind, fast-forward and stop the recording or playback, such that the user 303 can review a comment 307 before posting it, and rerecord it if desired. In some embodiments, the audiovisual content posting system 101 imposes a time limit on audiovisual comments 307, whereas in other embodiment these comments 307 can be of any length. Where a time limit is utilized, the specific length of the limit is a variable design parameter (e.g., thirty seconds, one minute, three minutes, etc.). The recording of audiovisual comments 307 can be in different formats (e.g., AIF, MP3, MPEG, etc.) in different embodiments, depending upon, for example, the digital recording capabilities of the user's computing device 210 and/or the format of the audiovisual content 305 about which the user 303 is recording a comment 307.

Once the user 303 has recorded an audiovisual comment 307 that the user wishes to post, the audiovisual content posting system 101 can automatically transmit the recorded audiovisual comment 307 (typically in the form of the audiovisual file(s) resulting from the recording) to the originator 321 of the audiovisual content 305 that is the subject of the comment 307 (e.g., to the podcaster). It is to be understood that in some embodiments, the audiovisual content posting system 101 transmits the recorded audiovisual comment 307 to a destination other than the content originator 321. Typically, the transmission step is executed in response to the user 303 selecting an associated user interface component 317 (e.g., clicking a transmit button or the like). In one embodiment, the audiovisual content posting system 101 transmits the recorded audiovisual comment 307 to the address 311 in the database 309 associated with the instance of audiovisual content 305 about which the user 303 commented (this can be the address 311 of the content originator 321 or another address 311 as desired). It is to be understood that this address 311 can be in any electronic address format (e.g., an email address, an instant message address, the URL of a website, etc.). The specific format of the address 311 to which to transmit the comment 307 can drive the transmission mechanism used (e.g., email, instant message, HTTP, etc.).

In other embodiments, the address 311 to which to transmit the comment 307 can be determined other ways. For example, in one embodiment the audiovisual content posting system 101 transmits comments 307 to a specific email address or to a specific computer address (e.g., URL) associated with the audiovisual content posting system 101, e.g., located on a remote server 105 (not illustrated). The uploaded audiovisual comments 307 are then routed to the appropriate originator 321 (or other party) of the instance of audiovisual content 305 (e.g., a specific podcaster). In some embodiments, the audiovisual content posting system 101 also transmits a comment 307 to additional parties such as friends or colleagues of the user 303 (typically responsive to a directive from the user 303 to do so). Addresses 311 of additional parties to which to transmit the comment 307 can but need not be stored in the database 309. It is to be understood that the audiovisual content posting system 101 can distribute audiovisual comments 307 to any desired destination.

In some embodiments, the audiovisual content posting system 101 enables the user 303 to categorize recorded audiovisual comments 307 prior to posting them. For example, the user interface 301 of the audiovisual content posting system 101 could allow the user 303 to choose a category 315 of "positive," "negative," or "general" for a recorded comment 307, prior to transmitting it. It is to be understood that these are simply examples of categories 315. In various embodiments, more, fewer or different categories 315 can be used as desired, including nested levels of categories 315. In any case, one or more categories 315 can be transmitted with a comment 307 to the originator 321 of the audiovisual content 305 that is the subject of the comment 307 (or to another destination). The originator 321 or other party can use categories 315 to pre-classify, sort, or otherwise process received comments 307. In embodiments in which comments 307 are transmitted by email, categories 315 can be placed in the subject line for ease of processing by the content originator 321.

In some embodiments, the audiovisual content posting system 101 allows the user 303 to listen to, watch or otherwise output instances of audiovisual content 305 on which the user 303 plans to post a comment 307. This enables the user to review the specific instance of content 305 prior to recording the comment 307. In some embodiments, the audiovisual content posting system 101 allows the user 303 to review all of his/her previously posted comments 307, e.g., by selecting them from a list (not illustrated).

On the content originator 321 side, received audiovisual comments 307 can be posted to a website, added to the original program itself, or otherwise collected, published or distributed in whatever manner the originator 321 chooses. The comments 307 can even be collected into a new program (e.g., a new podcast) that could be offered as a follow-up and distributed to subscribers of the original show.

The term audiovisual content 305, as used herein, means either audio content, video content, or video and audio content. It is to be understood that the audiovisual content posting system 101 can distribute any type of audiovisual content 305, including but not limited to a comment 307 on a podcast or other type of program, or a whole new podcast.

Figure 4:
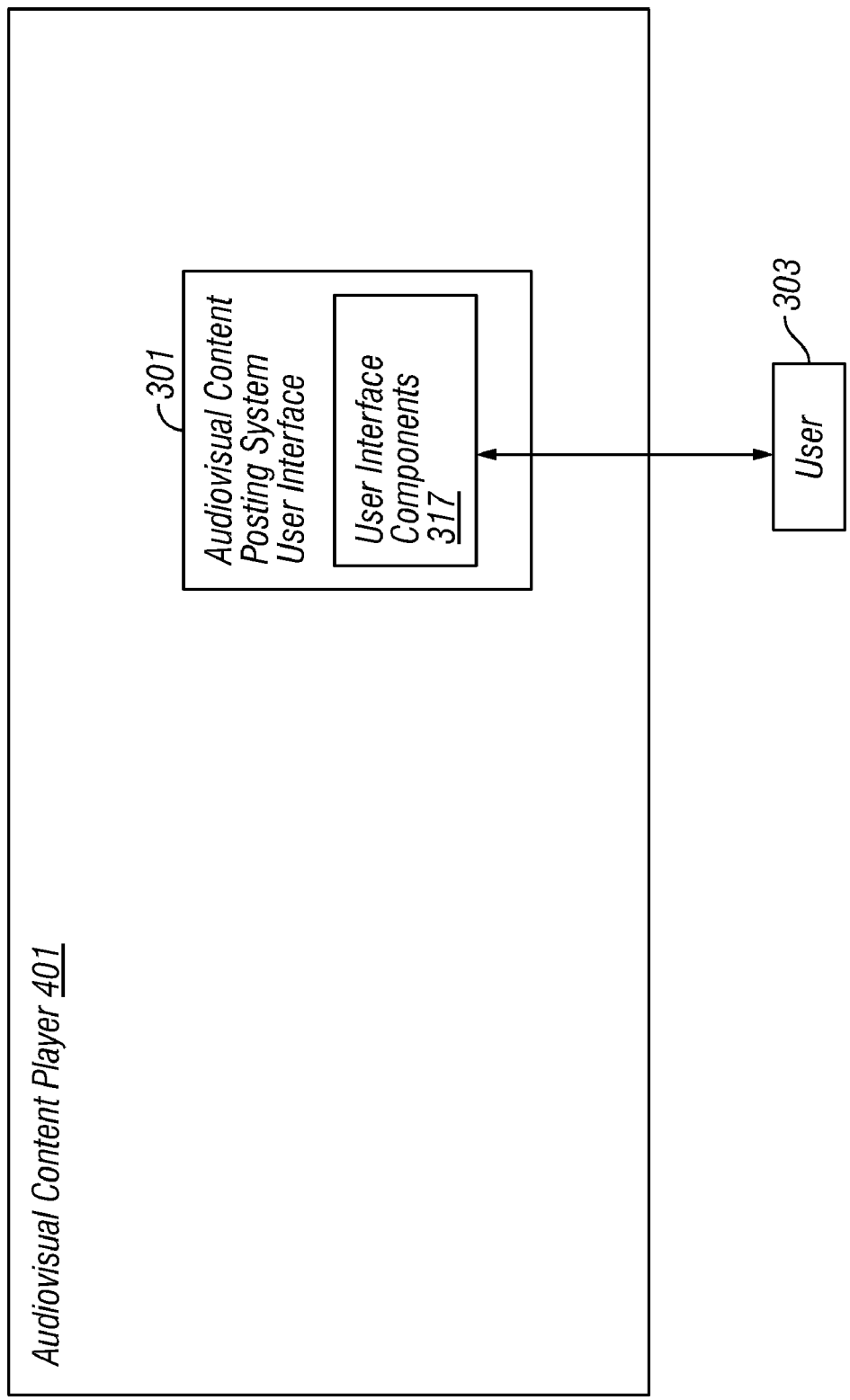
FIG. 4 is a block diagram of the operation of an audiovisual content posting system, according to other embodiments.

As illustrated in FIG. 4, in one embodiment the user interface 301 of the audiovisual content posting system 101 is instantiated in the form of an add-on to the software and/or hardware used to play podcasts and/or other audiovisual programs (e.g., an audiovisual content player 401 as illustrated). In this context, the user interface 301 for operating the audiovisual content posting system 101 could include or be in the form of, e.g., a user interface component 317 such as button or link that may be clicked at the end of a podcast program. Selecting this option would initiate the commenting procedure described above in conjunction with FIG. 3. The user interface component 317 to activate this feature can vary as desired (e.g., entering a voice command, activating a touch screen, etc.). In such embodiments, how much of the audiovisual content posting system 101 functionality to implement as an add-on to the audiovisual content player 401 is a variable design parameter. This audiovisual content posting system 101 functionality can be implemented in conjunction with podcast/audiovisual players 401 with open interfaces, to which the audiovisual content posting system 101 (or select components thereof such as the user interface 301) can be added. However, many podcasts are played on Apple iTunes® technology which is presently a closed system, and is thus not presently suitable for enhancement by the above-described add-on. For this reason, embodiments of the audiovisual content posting system 101 instantiated as an application program (e.g., an iPhone® app) separate from software and/or hardware used to play podcasts and/or other programs are desirable to use in the context of the current, closed iTunes® technology.

In any case, business models for using the audiovisual content posting system 101 include but are not limited to a.) charging content originators 321 such as podcasters for this service; b.) charging users 303 to post audiovisual content 305 (e.g., an audio comment 307, a new podcast program, etc.); c.) obtaining sponsorship or advertising; and/or d.) other ways of monetization.

As will be understood by those familiar with the art, the claimed subject matter may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the claimed subject matter or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for transmitting audiovisual comments concerning audiovisual content, the method comprising the steps of:
    prompting, by a computer, a user to identify a specific instance of audiovisual content on which to comment;
    receiving, by the computer, input from the user, said received input identifying a specific instance of audiovisual content;
    receiving, by the computer, audiovisual input from the user, said audiovisual input comprising a user entered comment in an audiovisual format concerning the user identified specific instance of audiovisual content;
    recording, by the computer, the audiovisual input received from the user; and
    automatically transmitting, by the computer, the recorded audiovisual input to a destination associated with the user identified specific instance of audiovisual content, wherein said transmitting identifies the recorded audiovisual input as a comment in an audiovisual format concerning the specific instance of audiovisual content.

2. The method of claim 1 further comprising:
    maintaining, by the computer, a database storing a) identifiers of a plurality of instances of audiovisual content and b) for each said instance of audiovisual content, an electronic address to which to transmit comments concerning that instance of audiovisual content.

3. The method of claim 2 wherein prompting the user to identify the specific instance of audiovisual content on which to comment further comprises:
    displaying, by the computer, a list identifying each of the plurality of instances of audiovisual content to the user; and
    prompting the user, by the computer, to select one instance of audiovisual content from the displayed list.

4. The method of claim 2 further comprising:
    detecting, by the computer, a change to an electronic address to which to transmit comments concerning a specific instance of audiovisual content identified in the database; and
    automatically updating the database, by the computer, to contain the changed electronic address to which to transmit comments concerning the specific instance of audiovisual content.

5. The method of claim 2 wherein automatically transmitting the recorded audiovisual input to the destination associated with the user identified specific instance of audiovisual content further comprises:
    retrieving from the database, by the computer, an electronic address to which to transmit comments concerning the user identified specific instance of audiovisual content; and
    automatically transmitting the recorded audiovisual input, by the computer, to the retrieved electronic address.

6. The method of claim 1 further comprising:
    transmitting, by the computer, the recorded audiovisual input to at least one additional party.

7. The method of claim 1 further comprising:
    prompting the user, by the computer, to categorize the user entered comment;
    receiving, by the computer, categorization information from the user concerning the user entered comment; and
    transmitting, by the computer, the categorization information concerning the user entered comment to the destination associated with the user identified specific instance of audiovisual content.

8. The method of claim 1 wherein:
    the specific instance of audiovisual content comprises a podcast, the recorded audiovisual input comprises a sound file and the destination associated with the specific instance of audiovisual content comprises a podcaster.

9. A computer system for transmitting audiovisual comments concerning audiovisual content, the computer system comprising:
    a processor;
    system memory;
    audiovisual recording hardware;
    a prompting component, configured for prompting a user to identify a specific instance of audiovisual content on which to comment;
    a user input receiving component, configured for receiving input from the user, said received input identifying a specific instance of audiovisual content;
    an audiovisual comment receiving component, configure for receiving audiovisual input from the user, said audiovisual input comprising a user entered comment in an audiovisual format concerning the user identified specific instance of audiovisual content;
    a recording component, configured for recording the audiovisual input received from the user; and
    a transmitting component, configured for automatically transmitting the recorded audiovisual input to a destination associated with the user identified specific instance of audiovisual content, wherein said transmitting identifies the recorded audiovisual input as a comment in an audiovisual format concerning the specific instance of audiovisual content.

10. The computer system of claim 9 further comprising:
a database maintaining component, configured for maintaining a database storing a) identifiers of a plurality of instances of audiovisual content and b) for each said instance of audiovisual content, an electronic address to which to transmit comments concerning that instance of audiovisual content.

11. The computer system of claim 10 wherein the prompting component is further configured for:
displaying a list identifying each of the plurality of instances of audiovisual content to the user; and
prompting the user to select one instance of audiovisual content from the displayed list.

12. The computer system of claim 10 further comprising:
a detecting component, configured for detecting a change to an electronic address to which to transmit comments concerning a specific instance of audiovisual content identified in the database; and
an updating component, configured for automatically updating the database to contain the changed electronic address to which to transmit comments concerning the specific instance of audiovisual content.

13. The computer system of claim 10 wherein the transmitting component is further configured for:
retrieving from the database an electronic address to which to transmit comments concerning the user identified specific instance of audiovisual content; and
automatically transmitting the recorded audiovisual input to the retrieved electronic address.

14. The computer system of claim 9 wherein the transmitting component is further configured for:
transmitting the recorded audiovisual input to at least one additional party.

15. The computer system of claim 9 further comprising:
a categorization prompting component, configured for prompting the user to categorize the user entered comment;
a categorization receiving component, configured for receiving categorization information from the user concerning the user entered comment; and
a categorization transmitting component, configured for transmitting the categorization information concerning the user entered comment to the destination associated with the user identified specific instance of audiovisual content.

16. At least one non-transitory computer readable medium containing a computer program product for transmitting audiovisual comments concerning audiovisual content, the computer program product comprising:
program code for prompting a user to identify a specific instance of audiovisual content on which to comment;
program code for receiving input from the user, said received input identifying a specific instance of audiovisual content;
program code for receiving audiovisual input from the user, said audiovisual input comprising a user entered comment in an audiovisual format concerning the user identified specific instance of audiovisual content;
program code for recording the audiovisual input received from the user; and
program code for automatically transmitting the recorded audiovisual input to a destination associated with the user identified specific instance of audiovisual content, wherein said transmitting identifies the recorded audiovisual input as a comment in an audiovisual format concerning the specific instance of audiovisual content.

17. The computer program product of claim 16 further comprising:
program code for maintaining a database storing a) identifiers of a plurality of instances of audiovisual content and b) for each said instance of audiovisual content, an electronic address to which to transmit comments concerning that instance of audiovisual content.

18. The computer program product of claim 17 wherein the program code for prompting a user to identify a specific instance of audiovisual content on which to comment further comprises:
program code for displaying a list identifying each of the plurality of instances of audiovisual content to the user; and
program code for prompting the user to select one instance of audiovisual content from the displayed list.

19. The computer program product of claim 17 further comprising:
program code for detecting a change to an electronic address to which to transmit comments concerning a specific instance of audiovisual content identified in the database; and
program code for automatically updating the database to contain the changed electronic address to which to transmit comments concerning the specific instance of audiovisual content.

20. The computer program product of claim 17 wherein the program code for automatically transmitting the recorded audiovisual input to the destination associated with the user identified specific instance of audiovisual content further comprises:
program code for retrieving from the database an electronic address to which to transmit comments concerning the user identified specific instance of audiovisual content; and
program code for automatically transmitting the recorded audiovisual input to the retrieved electronic address.

21. The method of claim 1 wherein:
the destination associated with the specific instance of audiovisual content comprises an originator of the instance of audiovisual content.

* * * * *